(12) United States Patent
Mazanek et al.

(10) Patent No.: US 8,702,123 B2
(45) Date of Patent: Apr. 22, 2014

(54) SAFETY ARRANGEMENT

(75) Inventors: Jan Mazanek, Billdal (SE); Par Sandinge, Alingsås (SE); Fredrik Kjell, Alingsås (SE); Palo Anders, Göteborg (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/505,897

(22) PCT Filed: Nov. 1, 2010

(86) PCT No.: PCT/SE2010/051188
§ 371 (c)(1),
(2), (4) Date: May 9, 2012

(87) PCT Pub. No.: WO2011/056128
PCT Pub. Date: May 12, 2011

(65) Prior Publication Data
US 2012/0223550 A1 Sep. 6, 2012

(30) Foreign Application Priority Data
Nov. 4, 2009 (SE) ..................................... 09175046

(51) Int. Cl.
*B60R 21/207* (2006.01)
*B60R 21/233* (2006.01)
*B60R 21/2338* (2011.01)

(52) U.S. Cl.
USPC ..................... 280/730.2; 280/729; 280/730.1; 297/216.1

(58) Field of Classification Search
USPC .................. 280/730.2, 729, 730.1; 297/216.1
See application file for complete search history.

(56) References Cited

U.S. PATENT DOCUMENTS

| 6,959,944 B2 * | 11/2005 | Mori et al. ................. 280/728.2 |
| 7,048,300 B2 | 5/2006 | Honda et al. |
| 7,086,663 B2 * | 8/2006 | Honda ....................... 280/730.2 |

(Continued)

FOREIGN PATENT DOCUMENTS

| DE | 102005059997 A1 | 6/2007 |
| DE | 102007045550 A1 | 4/2009 |

(Continued)

OTHER PUBLICATIONS

International Search Report and Written Opinion of the ISA for PCT/SE2010, ISA/SE, Stockholm, mailed Feb. 8, 2011.

(Continued)

*Primary Examiner* — Ruth Ilan
*Assistant Examiner* — Darlene P Condra
(74) *Attorney, Agent, or Firm* — Harness, Dickey & Pierce, P.L.C.

(57) ABSTRACT

A vehicle seat includes a seat frame, a first air-bag unit and a second air-bag unit. The seat frame is at least partially covered by a padding material and substantially covered by a cover. The first air-bag unit includes a first air-bag mounted within an outboard side of the seat, and substantially covered by the cover. The second air-bag unit includes a second air-bag mounted within the outboard side of the seat and substantially covered by the cover. The first air-bag is configured to inflate and burst through the cover, when activated, and to bear against an occupant of the seat sitting in a normal position in the seat, thereby exerting a pushing force against the occupant in an inboard direction. The second air-bag is configured to inflate and burst through the cover when activated, and to occupy a position between an occupant of the seat and an exterior side wall of the vehicle.

14 Claims, 4 Drawing Sheets

(56) References Cited

U.S. PATENT DOCUMENTS

| | | | |
|---|---|---|---|
| 7,134,685 B2* | 11/2006 | Panagos et al. | 280/730.2 |
| 7,542,836 B1* | 6/2009 | Norton | 701/45 |
| 7,556,118 B2* | 7/2009 | Huh et al. | 180/274 |
| 7,669,888 B2 | 3/2010 | Sato et al. | |
| 7,681,907 B2 | 3/2010 | Svenbrant et al. | |
| 7,819,421 B2 | 10/2010 | Naito et al. | |
| 7,848,885 B2* | 12/2010 | Hayasaka | 701/301 |
| 2002/0027339 A1* | 3/2002 | Breed | 280/730.2 |
| 2003/0184061 A1 | 10/2003 | Honda et al. | |
| 2004/0075254 A1 | 4/2004 | Honda | |
| 2004/0232666 A1 | 11/2004 | Sato et al. | |
| 2006/0255572 A1 | 11/2006 | Svenbrandt et al. | |
| 2008/0231026 A1 | 9/2008 | Naito et al. | |
| 2009/0020988 A1 | 1/2009 | Sato et al. | |
| 2011/0169250 A1 | 7/2011 | Breuninger et al. | |

FOREIGN PATENT DOCUMENTS

| | | |
|---|---|---|
| DE | 102009021635 A1 | 11/2010 |
| GB | 2357999 A | 7/2001 |
| WO | 2008110610 A1 | 9/2008 |
| WO | 2010007055 A1 | 1/2010 |

OTHER PUBLICATIONS

Examination Report regarding European Application No. 09175046.3 dated Jun. 14, 2012.

Examination Report regarding European Application No. 09175046.3 dated Nov. 2, 2012.

Extended European Search Report regarding Application No. 09175046.3-1523 dated Mar. 29, 2010.

* cited by examiner

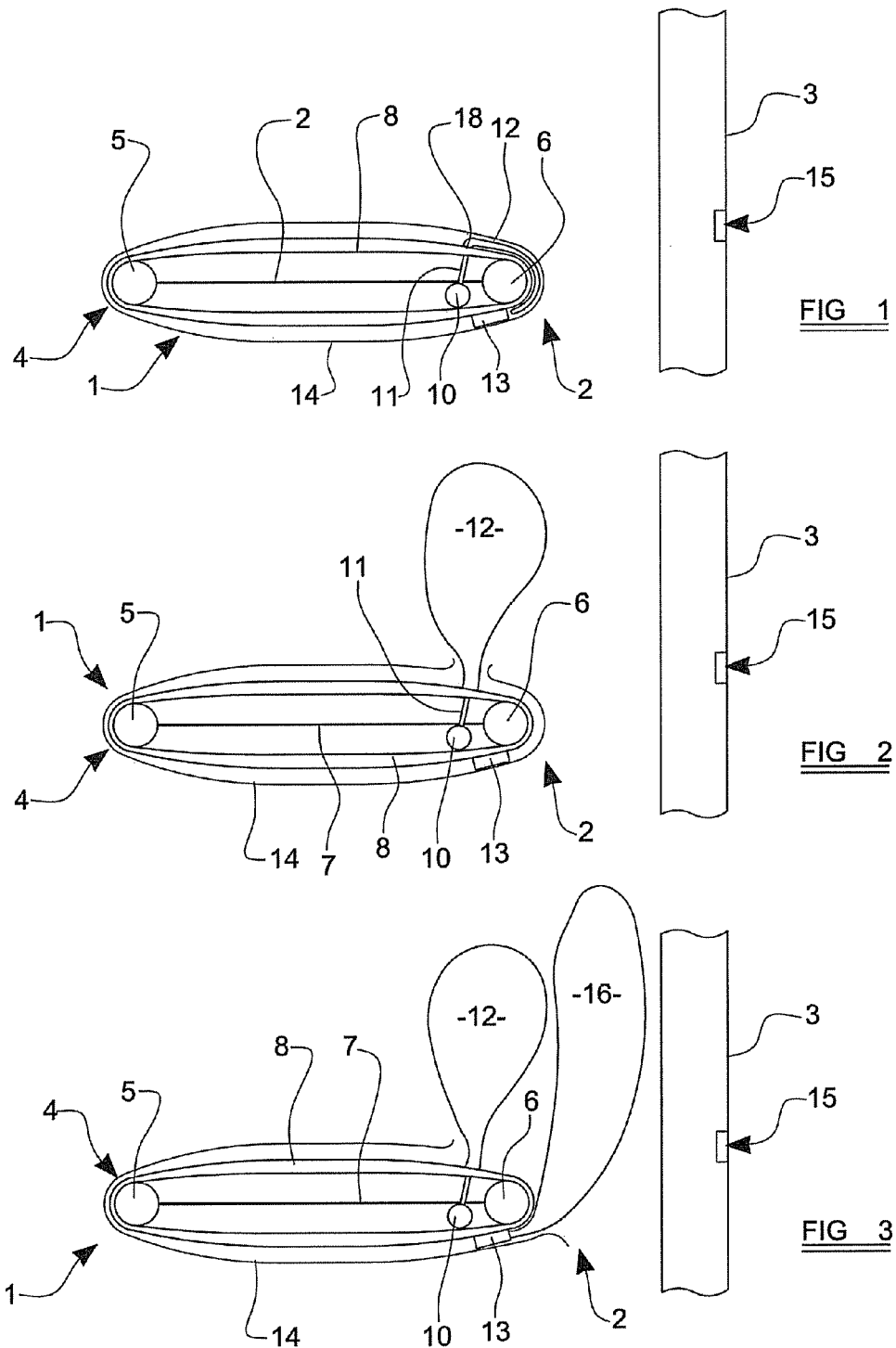

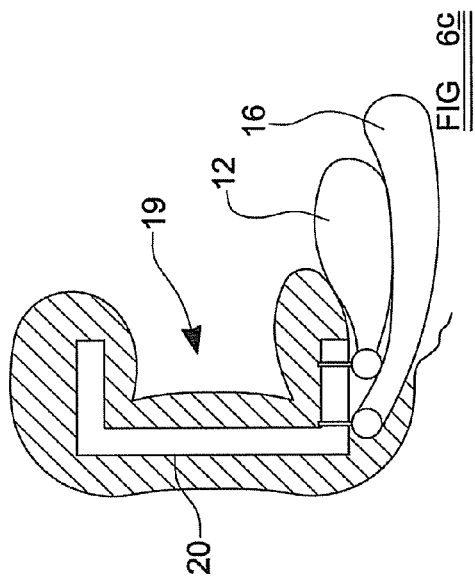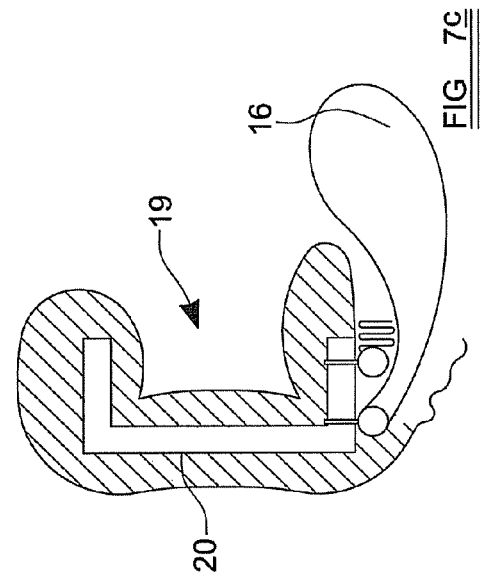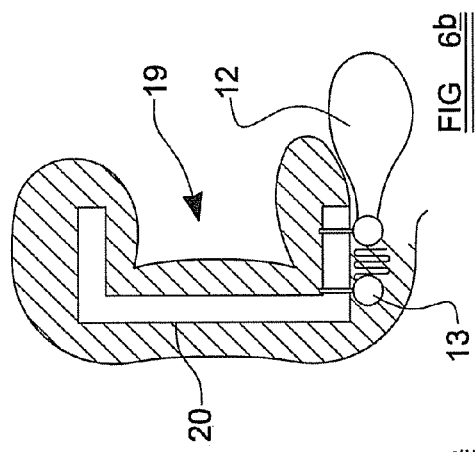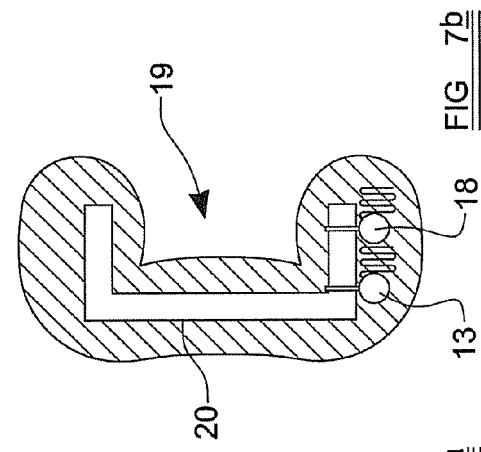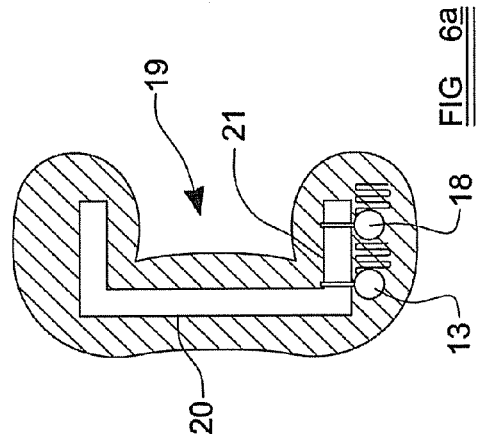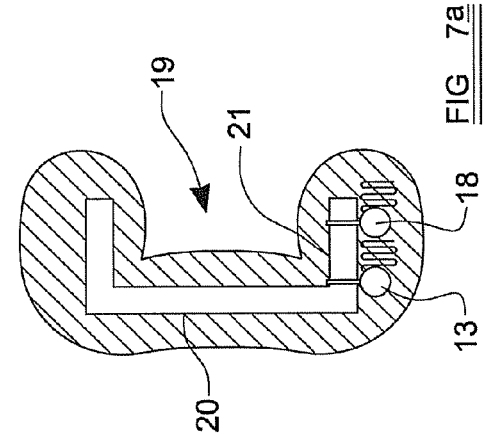

SAFETY ARRANGEMENT

CROSS-REFERENCE TO RELATED APPLICATIONS

This application is a 371 U.S. National Stage of International Application No. PCT/SE2010/05118, filed Nov. 1, 2010. This application claims priority to European Patent Application No. EP 09175046.3, filed Nov. 4, 2009. The disclosures of the above applications are incorporated herein by reference.

FIELD

THIS INVENTION relates to a safety arrangement, and in particular concerns an arrangement to protect an occupant of a vehicle seat in the event of a side impact.

BACKGROUND

It is known in the art that there are problems associated with protecting the occupant of a vehicle seat in the event of the vehicle being involved in a side impact. If a vehicle is involved in a head-on impact, then there are typically relatively large regions of the vehicle that may crumple and deform to absorb some of the energy associated with the impact, for instance the bonnet and engine of the vehicle. In addition, occupants of front seats of a motor vehicle tend to be seated at least around arm's length from the dashboard in front of them, and so there is a relatively large space in which to inflate an air-bag to cushion the impact experienced by passengers.

Further, the time between the beginning of the impact (i.e. the front bumper of the vehicle contacting another object) and large acceleration forces acting on vehicle occupants is relatively long, largely as a result of the presence of considerable forward crumple zones, as discussed above.

Vehicle occupants are generally less well-protected in the event of a side impact, however, as the thickness of the vehicle exterior wall is typically much less than the thickness of the front portions of the vehicle. In addition, the occupant is usually positioned relatively close to the vehicle's side wall. This means that very little crumple zone is available, and relatively little deformation of the side of the vehicle is required before the side of the vehicle comes into direct contact with the occupant. Further, the length of time between the start of the impact and large acceleration forces acting on the seat occupant is small.

One approach to reducing injuries in the event of a side impact is disclosed in US2009/0020988, which discloses a vehicle seat having two air-bags mounted on an exterior side thereof (i.e. the side closest to the exterior wall of the vehicle on the side of the vehicle on which the seat is installed). One air-bag is a conventional side impact air-bag, which inflates to occupy a position between the vehicle's exterior side wall and the seat occupant. The second air-bag inflates, remaining within an outboard part of the seat, causing the outboard part of the seat to expand and swell, thus pushing the occupant of the seat both forward and inwardly towards the centre of the vehicle. The second air-bag is activated at as early a stage as possible in a crash situation, with the aim being to increase the distance between the seat occupant and the vehicle's side wall.

SUMMARY

It is an object of the present invention to provide an improved safety device of this type.

Accordingly, one aspect of the present invention provides a vehicle seat having an outboard side and an inboard side and comprising: a seat frame which is at least partially covered by a padding material and substantially covered by a cover; a first air-bag unit comprising a first air-bag which is mounted within an outboard side of the seat, and substantially covered by the cover; and a second air-bag unit comprising a second air-bag which is mounted within the outboard side of the seat, and substantially covered by the cover, the first air-bag being configured, when activated, to inflate and burst through the cover, and to bear against an occupant of the seat who is sitting in a normal position in the seat, thereby exerting a pushing force against the occupant in an inboard direction, and the second air-bag being configured, when activated, to inflate and burst through the cover, and to occupy a position between an occupant of the seat and an exterior side wall of the vehicle.

Advantageously, the seat frame comprises substantially upright inboard and outboard members.

Preferably, the first air-bag is mounted inboard of the outboard upright member.

Conveniently, a strap or tether is connected between a distal end of the first air-bag and an inboard side of the seat frame.

Advantageously, separate inflators are provided for the first and second air-bags.

Preferably, first and second air-bag units are configured to be activated separately from one another.

Conveniently, the first air-bag unit is configured to be activated before the second air-bag unit.

Advantageously, the second air-bag unit is not activated until the first air-bag is substantially fully inflated.

Preferably, when the first and second air-bag units have been activated, the first and second air-bags overlap one another.

Conveniently, when both air-bag units have been activated, the first and second air-bags both lie between a normal position of a seat occupant and the adjacent portion of the vehicle's side wall.

Advantageously, a line extending from the normal position of a chest of an occupant, laterally outwardly toward the vehicle's side wall, will pass through both air-bags once the first and second air-bag units have been activated.

Another aspect of the present invention provides a safety arrangement comprising a seat according to any preceding claim in combination with one or more vehicle sensors.

Preferably, the first and second air-bag units are each configured to be activated in response to the outputs from one or more of the sensors.

Conveniently, the safety arrangement is configured so that the first air-bag is activated in response to different thresholds of a measured parameter being sensed by one or more of the same sensors.

Advantageously, the safety arrangement is configured so that the first air-bag and second air-bags are activated in response to outputs from one or more different sensors.

Preferably, the safety arrangement is configured so that the first air-bag is activated at least partly in response to an output from one or more sensors that detect the position and/or velocity of an object relative to the vehicle before any collision between the vehicle and the object, and the second air-bag is activated at least partly in response to an output from one or more sensors that detect a collision between the vehicle and an object.

Conveniently, if the severity of an impact is determined to be below a predetermined threshold, the first air-bag unit will not be activated and only the second air-bag unit will be activated.

A further aspect of the present invention provides a vehicle incorporating a safety arrangement according to the above.

BRIEF DESCRIPTION OF THE DRAWINGS

In order that the present invention may be more readily understood embodiments thereof will now be described, by way of example, with reference to the accompanying drawings, in which:

FIGS. 1 to 3 show stages in the deployment of a safety arrangement according to one embodiment of the present invention;

FIGS. 6a to 6c show stages in the deployment of a safety arrangement according to another embodiment of the present invention;

FIGS. 7a to 7c show stages in the deployment of a safety arrangement according to yet another embodiment of the present invention;

DETAILED DESCRIPTION

Figure 4:
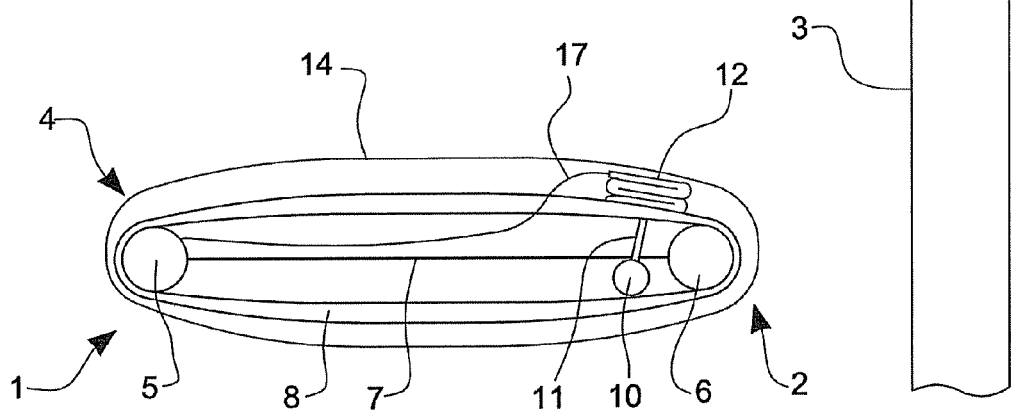
FIGS. 4 and 5 show stages in the deployment of a safety arrangement according to a further embodiment of the present invention.

Turning firstly to FIG. 1, a cut-away view is shown of a seat back 1 of a vehicle seat, as viewed looking from the top end of the seat back 1 along a line parallel with the plane of the seat back 1. The seat back 1 has an outboard side 2, which is the side closest to the vehicle's side wall 3 on the side of the vehicle on which the seat is mounted. The seat back 1 also has an inboard side 4.

The seat is formed from a seat frame which, in an embodiment, comprises a pair of upright support members 5,6, one on each side of the seat back 1. A wire mesh 7 or the like preferably extends between the upright members 5,6 to provide support for the back of an occupant sitting in the seat.

A layer of foam or similar padding 8 is provided around the upright members 5,6 and the wire mesh 7, to provide cushioning for the seat occupant, as is known in the art.

A first air-bag unit 18 is provided as part of the seat back 1 is mounted at or near the outboard side 2 of the seat back 1. The first air-bag unit 18 comprises an inflator 10 which, in the embodiment shown in FIG. 1, is provided within the padding 8 of the seat back 1, on a rear side of the wire mesh 7. A delivery hose 11 extends forwardly from the inflator 10, passing through a front part of the padding 8 and being connected to an inflatable air-bag cushion 12. In an embodiment, the air-bag cushion 12 is formed from two overlapping layers of fabric which are sewn together at their edges. One edge of the cushion 12 is attached to the front surface of the padding 8 at a region which is preferably just inboard of the upright support member 6 disposed on the outboard side 2 of the seat back 1. The delivery hose 11 is in communication with the interior of the air-bag cushion 12, and is preferably connected to the air-bag cushion 12 at or near the region where it is connected to the padding 8 of the seat back 1.

The cushion 12 is preferably folded around the outboard side of the padding 8 of the seat back 1, so that a distal end of the cushion 12 lies behind the outboard side 2 of the seat back 1. The cushion 12 may be folded so as to lie in front of the seat back 1, however.

A second air-bag unit 13 is provided at the rear of the outboard side 2 of the seat back 1. The second air-bag unit 13 is a known side air-bag unit and, as will be understood in the art, comprises a further inflatable cushion and an inflator.

Activation of the safety system will now be described.

In the event of a side impact, the first air-bag unit 18 is activated at an early stage. Activation of the first air-bag unit 18 will depend on signals received from vehicle sensors. These sensors may include impact sensors 15 which are provided on or near an exterior surface of the vehicle (for instance, the exterior surface of the vehicle side wall 3 which is beside the outboard side 2 of the seat back 1). Sensors which can detect proximity of an object to the side of the vehicle, and relative velocity between the vehicle and the object, before a collision occurs may also be used, for instance radar or lidar-based sensors. If such sensors are used, it may be possible to trigger the first air-bag unit 18 before an impact has occurred, if the signals received from the sensors indicate that a crash event is inevitable or likely.

When the first air-bag unit 18 is activated, the inflator 10 delivers pressurised gas through the delivery hose 11 into the interior of the inflatable cushion 12. This causes the cushion 12 to inflate, bursting through the cover 14 of the seat back 1. As will be appreciated in the art, one or more predetermined lines of weakness may deliberately be included in the cover 14, to allow the cushion 12 to burst easily through the cover 14 in the desired manner.

As discussed above, the cushion 12 is mounted inboard of the upright support member 6 which is provided on the outboard side 2 of the seat back 1. The cushion 12 therefore inflates away from the upright member 6, and when inflated, protrudes from the front surface of the seat back 1 in a forward and inboard direction. It will be appreciated that, if an occupant of the seat is sitting normally in the seat, the cushion 12 will contact and bear against the seat occupant, exerting a pushing force against the seat occupant in an inboard direction. The air-bag cushion 12 may also exert a pushing force against the seat occupant in a forward direction, with the result that the overall motion of the seat occupant with respect to the seat is diagonally inboard and forward.

It will be appreciated that a result of this will be to push the seat occupant towards the longitudinal axis of the vehicle, thus increasing the distance between the occupant and the exterior side wall 3 of the vehicle.

In the embodiment shown in FIG. 2, the cushion 12 of the first air-bag unit 18 reaches substantially full inflation before activation of the second air-bag unit 13. However, the invention is not limited to this. Preferably, the second air-bag unit 13 is activated after the activation of the first air-bag unit 18, but the activation of the second air-bag unit 13 may occur before the cushion 12 of the first air-bag unit has reached full inflation. Alternatively, the second air-bag unit 13 may be activated substantially simultaneously with, or even before, the first air-bag unit 18.

Referring to FIG. 3, following inflation of the cushion 12 of the first air-bag unit 18, the second air-bag unit 13 is activated. The second air-bag unit 13 is a conventional unit, which includes a second inflatable cushion 16 which is inflated, again bursting through the cover 14 of the seat back 1. The second cushion 16 may burst through an aperture in the seat cover 14 formed by the inflation of the first air-bag cushion 12, or may break the seat cover 14 in one or more new places. The second cushion 16 inflates to occupy a space between the vehicle's exterior wall 3 and the seat occupant, thus serving to protect the occupant during the side impact.

In preferred embodiments, the first air-bag unit 18 is activated in response to sensors which indicate that a crash event is inevitable or likely, before the impact has actually occurred, and the second air-bag unit 13 is activated in response to sensors which indicate that an impact has occurred. In other embodiments, the first and second air-bag units 18,13 may be activated in response to outputs from one or more of the same sensors, but different thresholds may be applied in respect of the activation of the two air-bag units 18,13. For instance, a first, lower threshold for sensed lateral acceleration of the vehicle may be applied for activation of the first air-bag unit 18, and a second, higher threshold for may be applied for sensed lateral acceleration of the vehicle may be applied for activation of the second air-bag unit 13. Combinations of thresholds of parameters measured by two or more sensors may be used, as is well known in the art.

It will be appreciated that arrangement of the type described above will be particularly advantageous in protecting seat occupants in the event of a side impact. The activation of the first air-bag unit 18 will push the seat occupant inwardly towards the centre of the vehicle, thus increasing the distance between the seat occupant and the vehicle's exterior wall. The fact that the cushion 12 of the first air-bag unit 18 bursts through the seat cover 14 and contacts the seat occupant directly means that the first air-bag unit 18 will be particularly effective at moving the seat occupant.

Further, the combination of two air-bag cushions 12,16 inflating between the seat occupant and the vehicle's exterior wall 3 will provide extra protection, and reduce the risk of injury arising from the side impact.

In preferred embodiments of the invention, the first and second air-bag cushions 12,16 burst through the cover 14 of the seat and overlap with one another. In other words, once deployed at least a part of each of the air-bag cushions 12,16 is positioned directly between the normal position of an occupant of the seat (or, indeed, the expected position of the occupant of the seat after having been moved by the first air-bag cushion 12) and the portion of the vehicle's side wall that is adjacent the position of the occupant. In advantageous embodiments, if a generally horizontal line is drawn from the expected position of the occupant's chest, laterally outwardly with respect to the vehicle towards the vehicle's side wall, the line will pass through both air-bag cushions 12,16.

It will be appreciated that the presence of both air-bag cushions between the seat occupant and the vehicle's side wall will absorb additional energy from a side impact, thus helping to protect the occupant.

Figure 5:
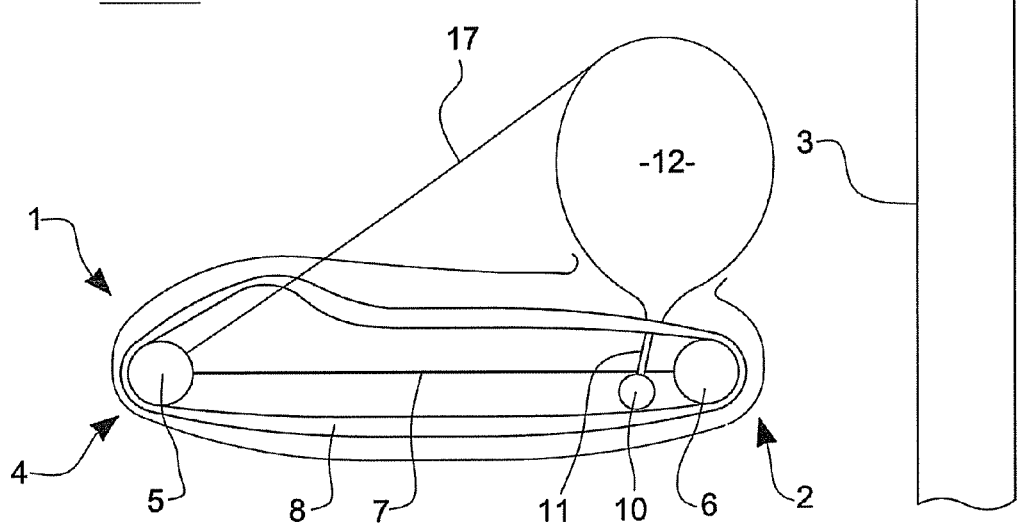

Turning to FIGS. 4 and 5, a further embodiment is shown. In this embodiment, the cushion 12 of the first air-bag unit 18 is concertina folded at the front side of the padding 8 that surrounds the seat back 1, and is again covered by the cover 14. A distal end of the cushion 12 has a strap 17 attached thereto. The strap 17 is fed through an aperture in the front surface of the padding 8, and is attached to the upright support member 5 which is located on the inboard side 4 of the seat back 1. The strap 17 therefore extends substantially across the entire length of the seat back 1.

When the first air-bag unit 18 is activated (as shown in FIG. 5), the inflatable cushion 12 is inflated and, as before, bursts through the front of the seat cover 14. As the distal end of the cushion 12 is connected by the strap 17 to the inboard support member 5, the distal end of the cushion 12 is pulled inboard by the strap 17 as the air-bag cushion 12 inflates. The strap 17 will also be pulled taut between the distal end of the cushion 12 and the inboard support member 5, and may burst through the padding 8 and cover 14 of the seat back 1.

It will be understood that the provision of the strap 17 will help to pull the air-bag cushion 12 inwardly during inflation, thus increasing the effectiveness of the cushion 12 exerting an appropriate pushing force on an occupant of the seat.

Secondly, the strap 17 itself will, as it is pulled taut, also exert a force on the seat occupant, tending to push the seat occupant inboard and forwardly.

The strap 17 need not be attached to the very distal end of the air-bag cushion 12 and may be attached to any other suitable part of the cushion 12. Also, the strap 17 need not be attached directly to the inboard support member 5 and may, in other embodiments, be attached to another suitable part of the seat, preferably to a part of the seat which is located at or near the inboard side 5 thereof.

The second air-bag unit 13 is omitted from FIGS. 4 and 5 for the purposes of clarity, but the embodiment shown in these figures will also include a second air-bag unit.

FIGS. 6a to 6c and 7a to 7c show deployment of a further safety arrangement embodying the present invention during a high severity crash and a low severity crash, respectively.

The safety arrangement shown FIGS. 6a to 6c and 7a to 7c comprises a seat 19 comprising a frame 20 covered by upholstery 21. First and second air-bag units 13,18 are attached to a side member of the frame 20, with the first air-bag unit 18 being provided further forward along the side member 21 than the second air-bag unit 13. In the embodiment shown both of the air-bag units are mounted on an outboard side of the side member.

FIGS. 6a and 7a show the seat 19 prior to deployment of either of the air-bag units 13, 18.

Prior to impact with another object, pre-crash sensors of the vehicle determine the distance and relative speed of the object compared to the vehicle. If it is determined that an impact is inevitable or likely, and that the impact will be severe, the first air-bag module 18 may be activated, as shown in FIG. 6b, causing the first air-bag cushion 12 to be inflated, thus pushing the seat occupant away from the side wall of the vehicle.

If the impending impact is judged to be of low severity, however, the first air-bag unit 18 may remain undeployed as shown in FIG. 7b, as the risk of injury to the seat occupant is judged to be relatively low.

The analysis of signals from pre-crash sensors to determine the likely severity of an anticipated impact is well known in the art, and any suitable technique may be used for this.

Referring to FIGS. 6c and 7c, once the side impact has been detected the second air-bag module 13 is activated, so that the second air-bag cushion 16 is inflated into position between the seat occupant and the vehicle's side wall. If the first air-bag unit 13 was activated then, as shown in FIG. 6c, the first and second air-bag cushions 12,16 may overlap with one another once fully inflated, as discussed above.

Figure 8:
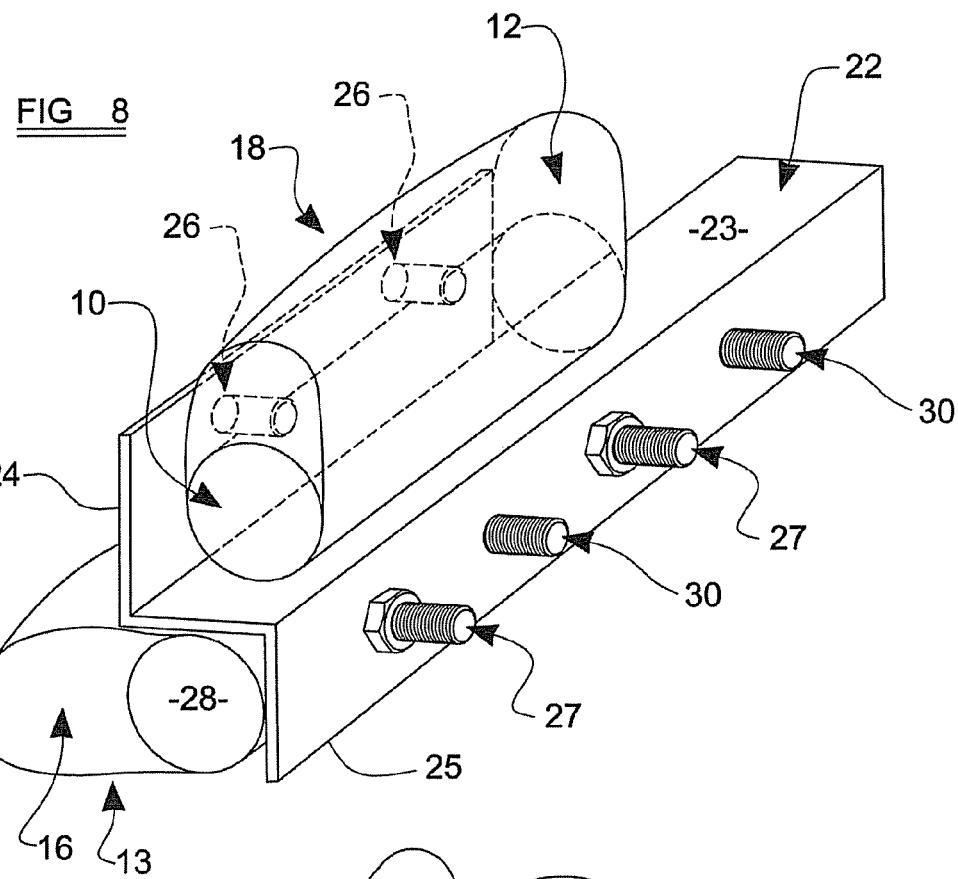
FIG. 8 shows a bracket for the safety arrangement.
Figure 9:
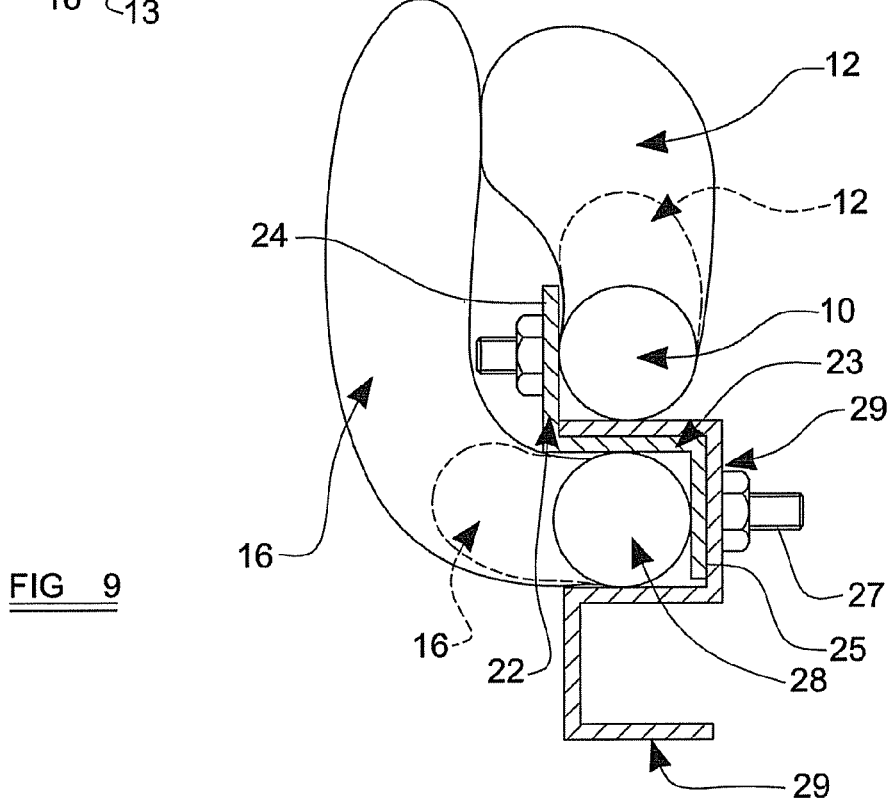
FIG. 9 shows the bracket attached to a seat frame.

Turning to FIGS. 8 and 9, these figures show arrangements suitable for use with the present invention.

A bracket 22 is of elongate form and comprises a main plate 23 having first and second side plates 24,25 attached to, or formed integrally at, its respective side edges. The first side plate 24 extends from a first edge of the main plate 23, extending substantially at right angles thereto in a first direction. The second side plate 25 extends substantially perpendicular to the main plate 23 (and generally parallel with the first side plate 24), in a second direction, which is generally opposite to the first direction. Seen end on, therefore, the bracket 22 forms an "S"-shape.

In the depicted embodiment the bracket 22 is arranged so that it is generally upright at one side of a vehicle seat (not shown) with the first side plate 24 extending generally forwardly from the main plate 23 (i.e. the first direction is approximately aligned with the forward direction of the vehicle).

The first air-bag module 18 is provided on a first, forward side of the main plate 23, adjacent the first side plate 24. In the depicted embodiment the first airbag unit 18 is attached to the first side plate 24 by attachment bolts 26 but alternatively, or in addition, the first air-bag unit 18 could be connected to the first surface of the main plate 23. As explained above, the first air-bag unit 18 comprises an inflator 10 and an inflatable cushion 12.

The second air-bag module 13 is provided on a second, rearward side of the main plate 23, adjacent the second side plate 25. In the depicted embodiment the second air-bag module 13 is attached to the second side plate 25 by a series of attachment bolts 27 but may additionally, or alternatively, be attached to the main plate 23. As described above the second air-bag module 13 comprises an inflator 28 and an inflatable cushion 16.

Further bolts 30 are also provided to attach the bracket 22 to the seat frame 29.

FIG. 9 shows the bracket 22 attached to a vehicle seat frame 29. In alternative embodiments, however, the bracket 22 may form a part of the seat frame, and need not be a separate component therefrom.

FIG. 9 shows how, as the first air-bag cushion 12 is inflated, the first side plate 24 will help to urge the air-bag cushion 12 inwardly towards the seat occupant, thus helping to ensure that the seat occupant is moved inwardly away from the side wall of the vehicle. In addition, the main plate 23 and second side plate 25 will help to guide the second air-bag cushion 16 to the vehicle's side wall (not shown) as it inflates, thereby ensuring that the second air-bag cushion 16 can effectively inflate between the vehicle's side wall and the first air-bag cushion 12 (or between the vehicle's side wall and the vehicle occupant, if the first air-bag cushion 12 has not been activated).

It will be appreciated that many other types of bracket, and/or configuration of seat frame, may be used with the present invention.

It will be appreciated that embodiments of the present invention will be particularly effective in reducing the likelihood of injury arising from a side impact.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A vehicle seat for a vehicle comprising:
   a seatback including a seat frame at least partially covered by a padding material and substantially covered by a cover;
   a first air-bag unit carried by the seatback and having a first air-bag mounted within an outboard side of the seatback, and substantially covered by the cover, the first air-bag being configured to inflate and burst through the cover when activated and to bear against an occupant of the seat sitting in a normal position in the seat, thereby exerting a pushing force against the occupant in an inboard direction;
   a second air-bag unit carried by the seatback and having a second air-bag mounted within the outboard side of the seatback, and substantially covered by the cover, the second air-bag being configured to inflate and burst through the cover when activated and to occupy a position between an occupant of the seat and an exterior side wall of the vehicle; and
   a strap or tether connected between a distal end of the first air-bag and an inboard side of the seat frame;
   wherein the first and second air-bags both deploy in a forward direction relative to the seatback such that the first and second air-bags overlap one another upon activation in a lateral direction.

2. The vehicle seat according to claim 1, wherein the seat frame includes substantially upright inboard and outboard members.

3. The vehicle seat according to claim 2, wherein the first air-bag is mounted inboard of the outboard upright member.

4. The vehicle seat according to claim 1, wherein the first and second air-bag units are configured to be activated separately from one another.

5. The vehicle seat according to claim 1, wherein the first air-bag unit is configured to be activated before the second air-bag unit.

6. The vehicle seat according to claim 1, wherein the first and second air-bags both lie between a normal position of a seat occupant and an adjacent portion of the vehicle's side wall upon activation.

7. The vehicle seat according to claim 1, wherein the seat frame includes first and second upright members and the first air-bag deploys from the seatback between the first and second upright members.

8. The vehicle seat according to claim 7, wherein the second air-bag deploys from the seatback from a position rearward of the second upright and is configured to forwardly expand.

9. The vehicle seat according to claim 1, wherein the second air-bag deploys laterally relative to the first air-bag.

10. The vehicle seat according to claim 1, wherein upon inflation, the first and second air-bags both include a first portion fixed to the seatback and an opposite, second portion spaced in the forward direction from the first portion.

11. A safety arrangement comprising: a vehicle seat including:
    a seat frame at least partially covered by a padding material and substantially covered by a cover;
    a first air-bag unit having a first air-bag mounted within an outboard side of the seat, and substantially covered by the cover, the first air-bag being configured to inflate and burst through the cover when activated and to bear against an occupant of the seat sitting in a normal position in the seat, thereby exerting a pushing force against the occupant in an inboard direction;
    a second air-bag unit having a second air-bag mounted within the outboard side of the seat, and substantially covered by the cover, the second air-bag being configured to inflate and burst through the cover when activated and to occupy a position between an occupant of the seat and an exterior side wall of the vehicle; and
    at least one vehicle sensor for activating the first and second air-bag units;
    wherein the first and second air-bags are activated in response to different thresholds of a measured parameter being sensed by the at least one vehicle sensor such that only the second air-bag unit will be activated if severity of an impact is determined to be below a predetermined threshold.

12. The safety arrangement according to claim 11, wherein the first and second air-bags are activated in response to outputs from one or more different sensors.

13. The safety arrangement according to claim 11, wherein the first air-bag is activated at least partly in response to an output from the at least one vehicle sensor that detects position and/or velocity of an object relative to the vehicle before any collision between the vehicle and the object, and the second air-bag is activated at least partly in response to an output from the at least one sensor that detects a collision between the vehicle and an object.

14. The safety arrangement according to claim 11 in combination with the vehicle.

\* \* \* \* \*